(12) United States Patent
Karczewicz

(10) Patent No.: US 8,467,449 B2
(45) Date of Patent: Jun. 18, 2013

(54) CAVLC ENHANCEMENTS FOR SVC CGS ENHANCEMENT LAYER CODING

(75) Inventor: Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1550 days.

(21) Appl. No.: 11/962,559

(22) Filed: Dec. 21, 2007

(65) Prior Publication Data

US 2008/0165844 A1    Jul. 10, 2008

Related U.S. Application Data

(60) Provisional application No. 60/883,961, filed on Jan. 8, 2007.

(51) Int. Cl.
*H04N 7/26* (2006.01)
(52) U.S. Cl.
USPC .................................................. 375/240.03
(58) Field of Classification Search
USPC ..................... 375/240.12, 240.24, 240.03
See application file for complete search history.

(56) References Cited

U.S. PATENT DOCUMENTS

| | | | |
|---|---|---|---|
| 6,144,322 A | 11/2000 | Sato | |
| 8,005,140 B2 * | 8/2011 | Yang et al. | 375/240.03 |
| 2003/0009722 A1 | 1/2003 | Sugiyama et al. | |
| 2006/0078049 A1 | 4/2006 | Bao et al. | |
| 2007/0110153 A1 * | 5/2007 | Cho et al. | 375/240.12 |
| 2007/0223580 A1 * | 9/2007 | Ye et al. | 375/240.12 |
| 2008/0152015 A1 * | 6/2008 | Benzreba et al. | 375/240.24 |

FOREIGN PATENT DOCUMENTS

| | | |
|---|---|---|
| EP | 0830029 A | 3/1998 |
| JP | 2006501740 A | 1/2006 |
| JP | 2006197610 A | 7/2006 |
| KR | 20050061777 | 6/2005 |
| RU | 2004125588 | 1/2006 |
| RU | 2005113308 | 1/2006 |
| RU | 2335845 | 10/2008 |
| WO | WO2005094081 | 10/2005 |
| WO | WO2007115129 | 10/2007 |

OTHER PUBLICATIONS

Joint Video Team (JVT) of ISO/IEC MPEG & ITU-T VCEG, CE7 Report, Multiple FGS layer coding for low-delay applications, JVT-R077, 18th Meeting, Jan. 14, 2006, Bangkok.

Shima, M. "Modified VLC for Refinement Pass," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S031, Mar. 31, 2006, XP030006410, pp. 1-8.

(Continued)

*Primary Examiner* — Mark Rinehart
*Assistant Examiner* — Gbemileke Onamuti
(74) *Attorney, Agent, or Firm* — Brent A. Boyd

(57) ABSTRACT

Context-adaptive variable length coding (CAVLC) for scalable video coding (SVC) coarse granular scalability (CGS) enhancement layer coding that utilizes the number of coefficients larger than one (NLrg1) as a syntax element. The coding of coeff_token is based on TotalCoeff and NLrg1 values. Levels are adaptively encoded based on NLrg1 syntax element total_zeros is encoded by adaptively selecting VLC tables based on an estimated number of a neighboring blocks' total_zeros.

25 Claims, 8 Drawing Sheets

OTHER PUBLICATIONS

Ye, Y., et al., "Improvements to FGS Layer Variable Length Coder," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S066, Mar. 31, 2006, XP002458086, pp. 1-10.

Daeok Kim et al.: "Implementation of high performance CAVLC for H.264/AVC video codec" Proceedings of 6th International Workshop on System on Chip for Real Time Applications (IEEE Cat. No. 06EX 1660), Cairo, Egypt, Dec. 27-29, 2006, pp. 20-23, XP031078657, IEEE Piscataway, NJ, USA, ISBN: 1-4244-0898-9.

Ridge J. et al.: "Variable length codes for SVC" Joint Video Team (JVT) of ISO/IEC MPEG & ITU-T VCEG(ISO/IEC JTC1/SC29/WG11 and ITU-T SG16 Q6), 17th Meeting, Nice, France, Oct. 14-21, 2005, No. JVT-Q040, pp. 1-6, XP002458085.

Karczewicz M. et al.: "SVC CAVLC for CGS enhancement layer" Joint Video Team (JVT) of ISO/IEC MPEG & ITU-T VCEG (ISO/IEC JTC1/SC29/WG11 and ITU-T SG16 Q.6), 22nd Meeting, Marrakech, Morocco, Jan. 13-19, 2007, No. JVT-V093, pp. 1-7, XP030006901.

Karczewicz M. et al.: "Refinement coef coding" Joint Video Team (JVT) of ISO/IEC MPEG & ITU-T VCEG(ISO/IEC JTC1/SC29/WG11 and ITU-T SG16 Q6), 21st Meeting, Hangzhou, China, Oct. 20-27, 2006. No. JVT-U132, Oct. 23, 2006, pp. 1-5. XP030006778.

"Advanced video coding for generic audiovisual services; H.264 (05/03)" ITU-T Standard Superseded (S). International Telecommunication Union, Geneva, CH, No. H.264 (05/03), May 30, 2003, pp. 157-164, XP002479727.

International Search Report—PCT/US08/050435, International Search Authority—European Patent Office—Jun. 20, 2008.

Written Opinion—PCT/US08/050435, International Search Authority—European Patent Office—Jun. 20, 2008.

Taiwan Search Report—TW097100763—TIPO—May 3, 2011.

* cited by examiner

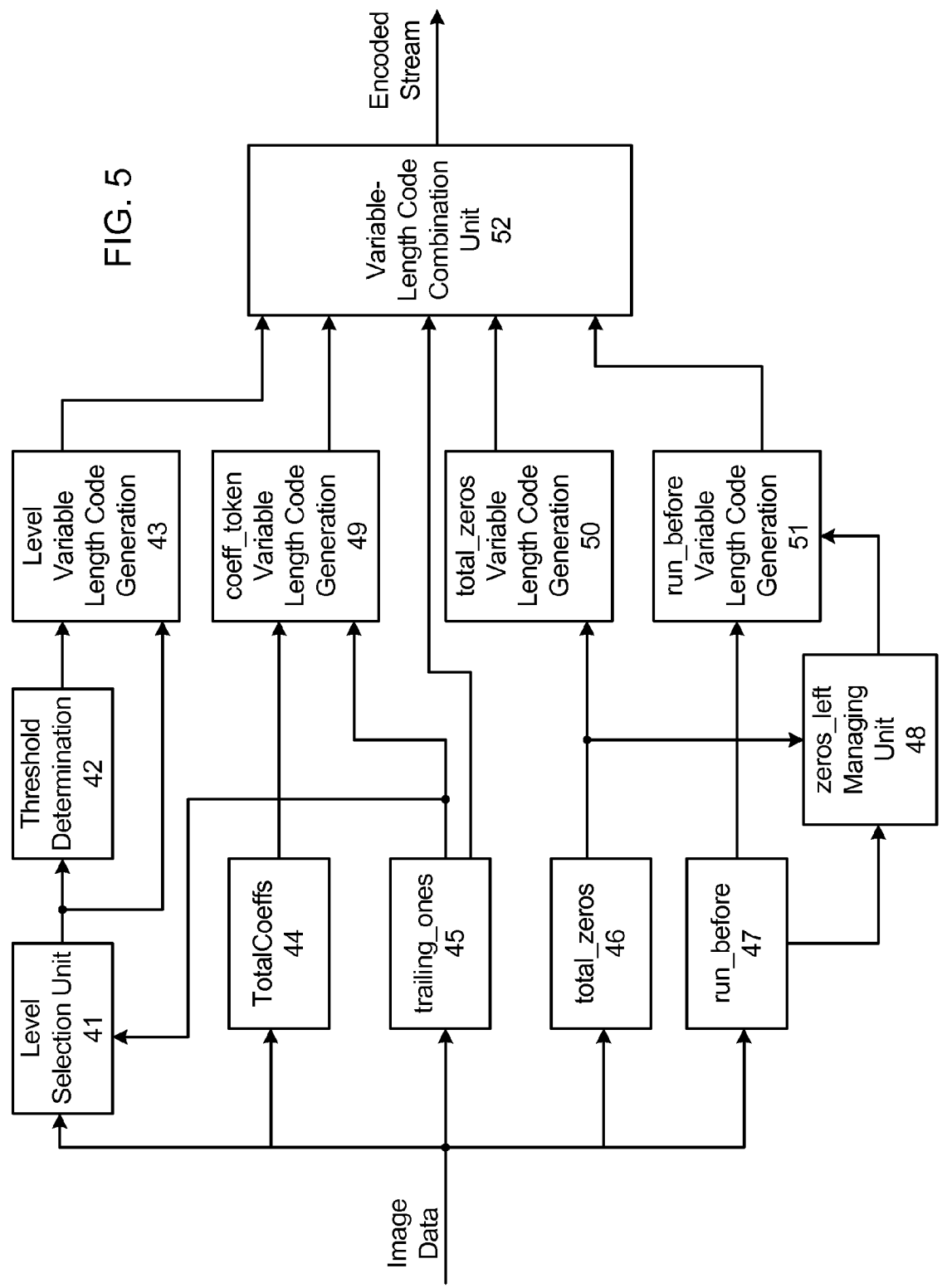

CAVLC ENHANCEMENTS FOR SVC CGS ENHANCEMENT LAYER CODING

CROSS-REFERENCE TO RELATED APPLICATIONS

This application claims priority to U.S. Patent Application No. 60/883,961, filed Jan. 8, 2007, which is incorporated herein by reference in its entirety.

BACKGROUND

I. Field

The subject matter herein relates generally to image processing.

II. Background

Development of communication technologies has led to an increase in video communication in addition to text and voice communication. Video data is usually voluminous and utilizes a large amount of bandwidth during transmission. To reduce bandwidth consumption, compression coding schemes may be used to communicate video sequences to wide range of devices, including digital televisions, digital direct broadcast systems, wireless communication devices, personal digital assistants (PDAs), laptop computers, desktop computers, video game consoles, digital cameras, digital recording devices, cellular or satellite radio telephones, and the like.

Different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC) and Scalable Video Coding (SVC). These video encoding standards support improved transmission efficiency of video sequences by encoding data in a compressed manner.

Context-adaptive variable length coding (CAVLC) may be a method used to encode zigzag scanned 4×4 and 2×2 residual blocks for H.264/AVC and SVC. In SVC coarse granular scalability (CGS), all the layers use the CAVLC for H.264/AVC and the same CAVLC methodology is applied for both base and enhancement layer coding. However, due to different prediction structures, different statistics of CGS enhancement layer residual result as compared to that of base layer, which results in inefficiency in CGS enhancement layer CAVLC residual coding.

SUMMARY

Context-adaptive variable length coding (CAVLC) for scalable video coding (SVC) coarse granular scalability (CGS) enhancement layer coding may be performed by utilizing the number of quantized input image data coefficients larger than one (NLrg1) as a syntax element. The coding of coeff_token may be based on TotalCoeff and NLrg1. Level coding may be performed using a VLC table selected based on the number of coefficients that are larger than one in the remaining coefficients. Total_zeros coding may be performed by adaptively selecting VLC tables based on a total_zeros estimate determined using number of total_zeros in the block above and to the left of the current block.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

FIG. 5 is a block diagram of a variable-length encoding apparatus based on the H.264 encoding scheme.

DETAILED DESCRIPTION

Figure 1:
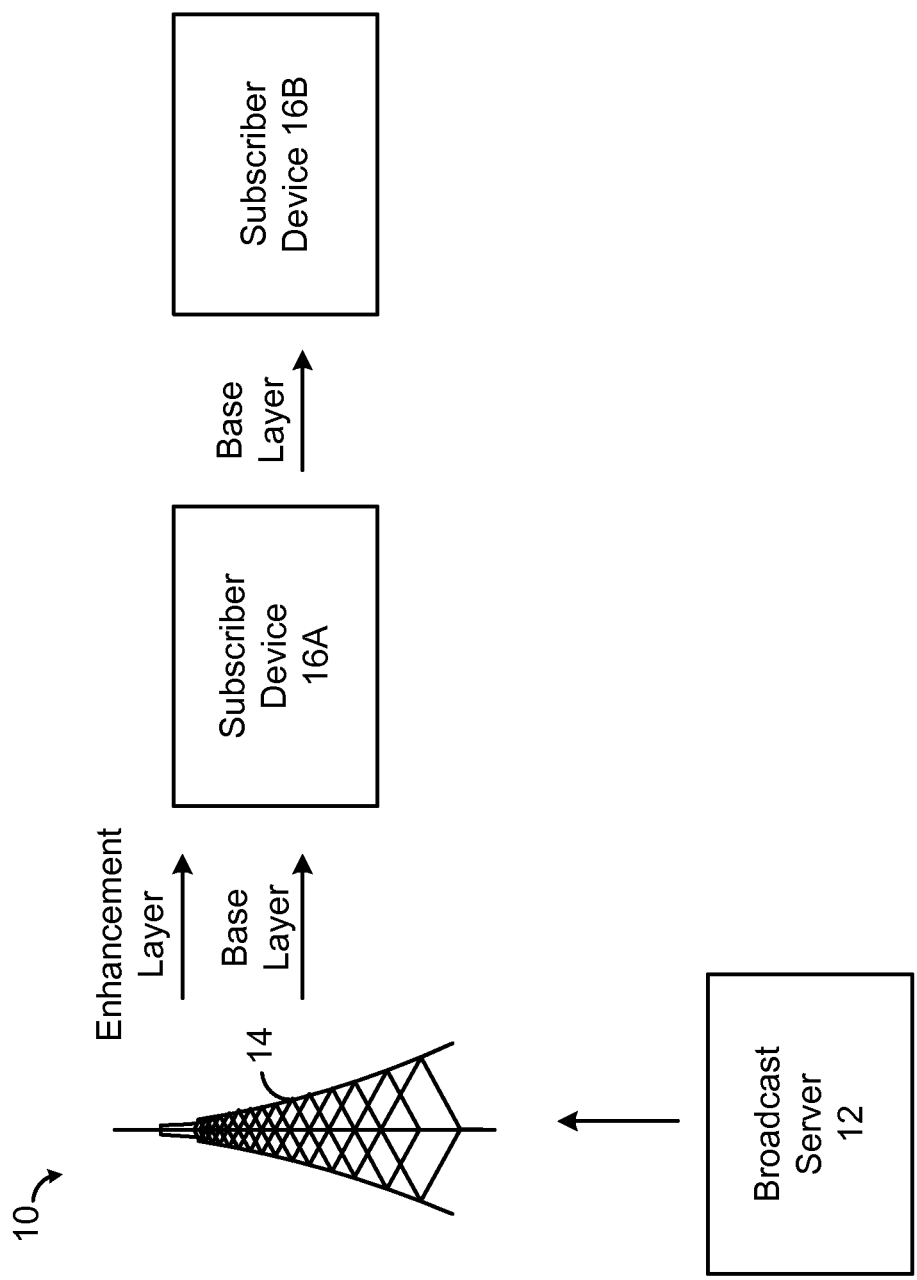
FIG. 1 is a block diagram illustrating a digital multimedia broadcasting system supporting video scalability.

Scalable video coding may be used to provide temporal and spatial scalability of video such that video content can be coded once, and streams having various qualities may be offered by a content provider. As an example, encoded video may include a base layer and an enhancement layer. The base layer carries a minimum amount of data necessary for video decoding and provides a base level of quality. The enhancement layer carries additional data that enhances the quality of the decoded video.

In general, a base layer may refer to a bitstream containing encoded video data which represents a first level of spatio-temporal-SNR scalability. An enhancement layer may refer to a bitstream containing encoded video data which represents the second level of spatio-temporal-SNR scalability. The enhancement layer bitstream is decodable in conjunction with the base layer, i.e., it contains references to the decoded base layer video data which are used to generate the final decoded video data.

Using hierarchical modulation on the physical layer, the base layer and enhancement layer can be transmitted on the same carrier or subcarriers but with different transmission characteristics resulting in different packet error rate (PER). The base layer has a lower PER for more reliable reception throughout a coverage area. The decoder may decode only the base layer or the base layer plus the enhancement layer if the enhancement layer is reliably received and/or subject to other criteria.

In some implementations, the techniques disclosed herein may be applied to implement low complexity video scalability extensions for devices that may conform to the H.264 standard. For example, extensions may represent potential modifications for future versions or extensions of the H.264 standard, or other standards. The H.264 standard was developed by the ITU-T Video Coding Experts Group and the ISO/IEC Moving Picture Experts Group (MPEG), as the product of partnership known as the Joint Video Team (JVT). The coded video data and scalable extensions may be carried in network abstraction layer (NAL) units. Each NAL unit is a network transmission unit that may take the form of a packet that contains an integer number of bytes. NAL units may carry either base layer data or enhancement layer data. The base layer bitstream syntax and semantics in a NAL unit may generally conform to an applicable standard, such as the H.264 standard, possibly subject to some constraints and/or modifications.

The techniques described in this disclosure may be used in combination with any of a variety of predictive video encoding standards, such as the MPEG-1, MPEG-2, or MPEG-4 standards, the ITU H.263 or H.264 standards, or the ISO/IEC MPEG-4, Part 10 standard, i.e., Advanced Video Coding (AVC), which is substantially identical to the H.264 standard. Application of such techniques to support low complexity extensions for video scalability associated with the H.264 standard will be described herein for purposes of illustration.

If decoding is performed in a client device such as a mobile handset, or other small, portable device, there may be limitations due to computational complexity and memory requirements. Accordingly, scalable encoding can be designed in such a way that the decoding of the base plus the enhancement layer does not significantly increase the computational complexity and memory requirement compared to single layer decoding. Appropriate syntax elements and associated semantics may support efficient decoding of base and enhancement layer data.

FIG. 1 is a block diagram illustrating a digital multimedia broadcasting system 10 supporting video scalability. In the example of FIG. 1, the system 10 includes a broadcast server 12, a transmission tower 14, and multiple subscriber devices 16A, 16B. The broadcast server 12 obtains digital multimedia content from one or more sources, and encodes the multimedia content, e.g., according to any of video encoding standards described herein, such as H.264 or a modification thereof. The multimedia content encoded by the broadcast server 12 may be arranged in separate bitstreams to support different channels for selection by a user associated with a subscriber device 16. The broadcast server 12 may obtain the digital multimedia content as live or archived multimedia from different content provider feeds.

The broadcast server 12 may include or be coupled to a modulator/transmitter that includes appropriate radio frequency (RF) modulation, filtering, and amplifier components to drive one or more antennas associated with the transmission tower 14 to deliver encoded multimedia obtained from the broadcast server 12 over a wireless channel. In some aspects, the broadcast server 12 may be generally configured to deliver real-time video services according to any of a variety of wireless communication techniques, such as code division multiple access (CDMA), time division multiple access (TDMA), frequency divisions multiple access (FDMA), orthogonal frequency division multiplexing (OFDM), or any combination of such techniques.

Each subscriber device 16 may reside within any device capable of decoding and presenting digital multimedia data, digital direct broadcast system, a wireless communication device, such as cellular or satellite radio telephone, a personal digital assistant (PDA), a laptop computer, a desktop computer, a video game console, or the like. The subscriber devices 16 may support wired and/or wireless reception of multimedia data. In addition, some subscriber devices 16 may be equipped to encode and transmit multimedia data, as well as support voice and data applications, including video telephony, video streaming and the like.

In some implementations, to support scalable video, the broadcast server 12 may encode the source video to produce separate base layer and enhancement layer bitstreams for multiple channels of video data. The channels may be transmitted generally simultaneously such that a subscriber device 16A, 16B can select a different channel for viewing at any time. Hence, a subscriber device 16A, 16B, under user control, may select one channel to view sports and then select another channel to view the news or some other scheduled programming event, much like a television viewing experience. In general, each channel includes a base layer and an enhancement layer, which are transmitted at different PER levels.

In the example of FIG. 1, two subscriber devices 16A, 16B are shown. However, the system 10 may include any number of subscriber devices 16A, 16B within a given coverage area. Notably, multiple subscriber devices 16A, 16B may access the same channels to view the same content simultaneously. FIG. 1 represents positioning of the subscriber devices 16A and 16B relative to the transmission tower 14 such that one subscriber device 16A is closer to the transmission tower, and the other subscriber device 16B is further away from the transmission tower. Because the base layer is encoded at a lower PER, it should be reliably received and decoded by any subscriber device 16 within an applicable coverage area. As shown in FIG. 1, both subscriber devices 16A, 16B receive the base layer. However, the subscriber 16B is situated further away from transmission tower 14, and may not reliably receive the enhancement layer.

The closer subscriber device 16A is capable of higher quality video because both the base layer and enhancement layer data are available, whereas the further subscriber device 16B is capable of presenting only the minimum quality level provided by the base layer data. Hence, the video obtained by the subscriber devices 16 is scalable in the sense that the enhancement layer can be decoded and added to the base layer to increase the signal to noise ratio of the decoded video.

Figure 2:
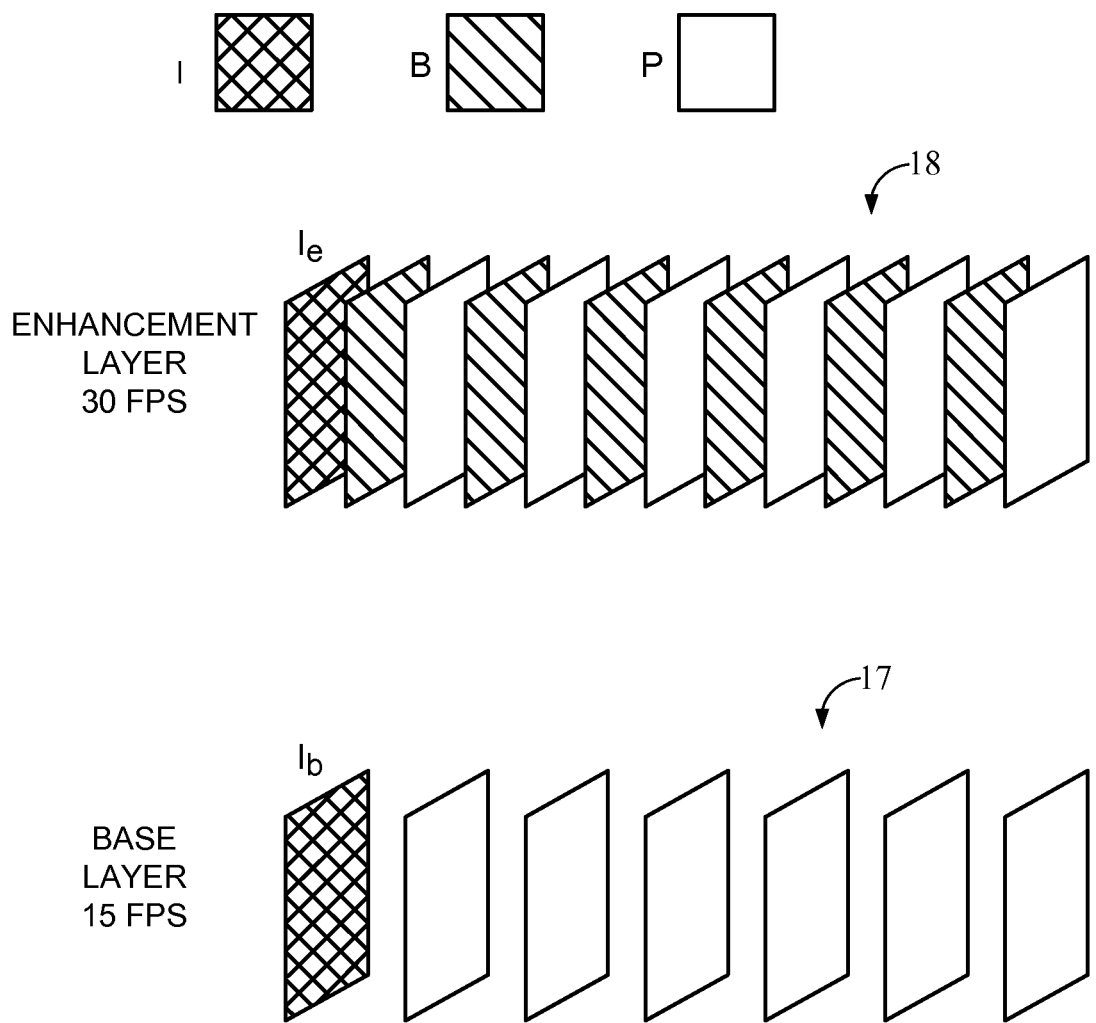
FIG. 2 is a diagram illustrating video frames within a base layer and enhancement layer of a scalable video bitstream.

FIG. 2 is a diagram illustrating exemplary video frames within a base layer 17 and enhancement layer 18 of a scalable video bitstream. Base layer 17 is a bitstream containing encoded video data that represents the first level of spatio-temporal-SNR scalability. Enhancement layer 18 is a bitstream containing encoded video data that represents a second level of spatio-temporal-SNR scalability. In general, the enhancement layer bitstream is only decodable in conjunction with the base layer, and is not independently decodable. Enhancement layer 18 contains references to the decoded video data in base layer 17. Such references may be used either in the transform domain or pixel domain to generate the final decoded video data.

Base layer 17 and enhancement layer 18 may contain intra (I), inter (P), and bidirectional (B) frames. The P frames in enhancement layer 18 rely on references to P frames in base layer 17. By decoding frames in enhancement layer 18 and base layer 17, a video decoder is able to increase the video quality of the decoded video. For example, base layer 17 may include video encoded at a minimum frame rate of 15 frames per second, whereas enhancement layer 18 may include video encoded at a higher frame rate of 30 frames per second. To support encoding at different quality levels, base layer 17 and enhancement layer 18 may be encoded with a higher quantization parameter (QP) and lower QP, respectively.

Figure 3:
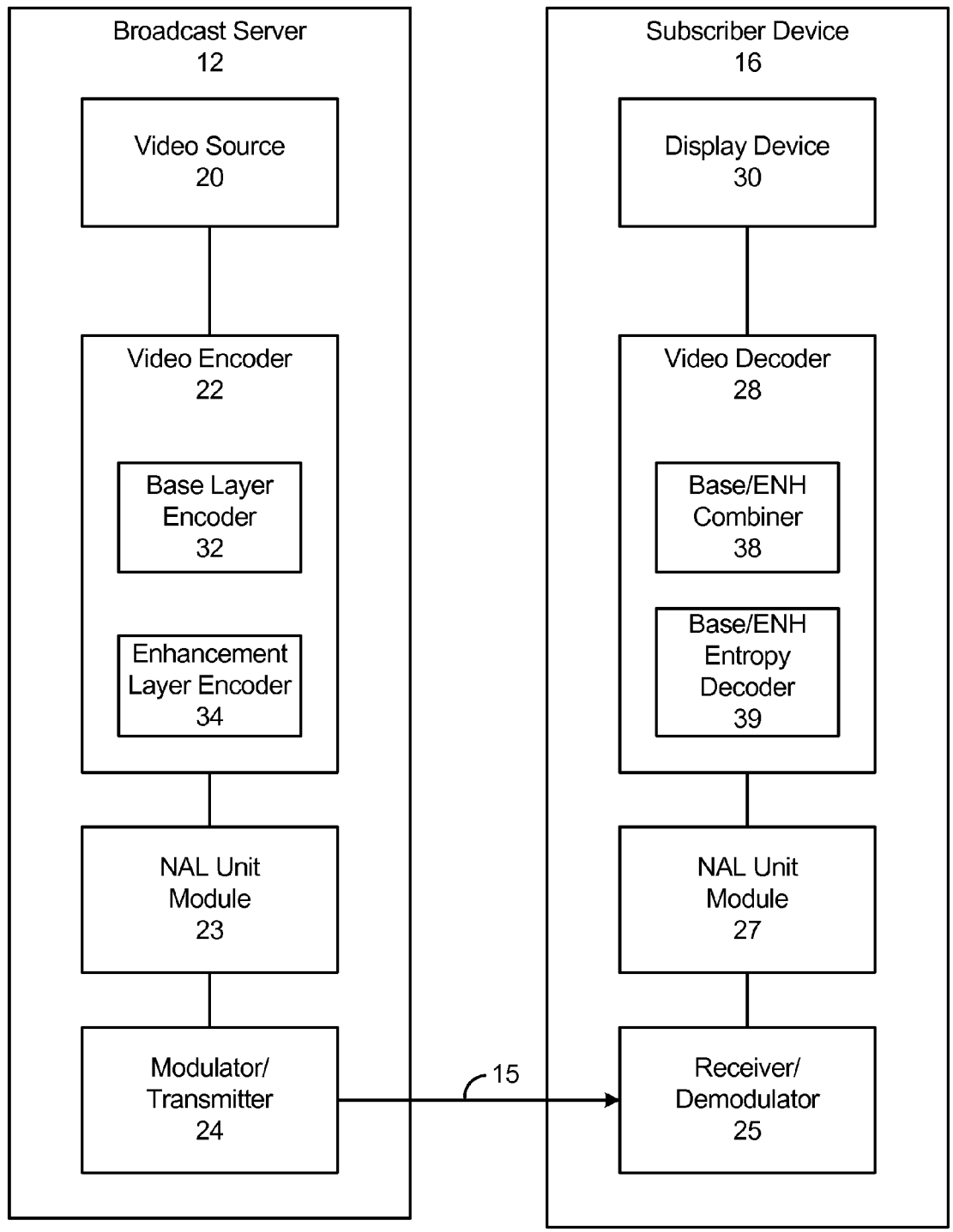
FIG. 3 is a block diagram illustrating exemplary components of a broadcast server and a subscriber device in the digital multimedia broadcasting system of FIG. 1.

FIG. 3 is a block diagram illustrating exemplary components of the broadcast server 12 and the subscriber device 16 in the digital multimedia broadcasting system 10 of FIG. 1. As shown in FIG. 3, the broadcast server 12 includes one or more video sources 20, or an interface to various video sources. The broadcast server 12 also includes a video encoder 22, a NAL unit module 23 and a modulator/transmitter 24. The subscriber device 16 includes a receiver/demodulator 26, a NAL unit module 27, a video decoder 28 and a video display device 30. The receiver/demodulator 26 receives video data from the modulator/transmitter 24 via a communication channel 15. The video encoder 22 includes a base layer encoder module 32 and an enhancement layer encoder module 34. The video decoder 28 includes a base layer/enhancement (base/enh) layer combiner module 38 and a base layer/enhancement layer entropy decoder 39.

The base layer encoder 32 and the enhancement layer encoder 34 receive common video data. The base layer encoder 32 encodes the video data at a first quality level. The enhancement layer encoder 34 encodes refinements that, when added to the base layer, enhance the video to a second, higher quality level. The NAL unit module 23 processes the encoded bitstream from the video encoder 22 and produces NAL units containing encoded video data from the base and enhancement layers. The NAL unit module 23 may be a separate component as shown in FIG. 3 or be embedded within or otherwise integrated with the video encoder 22. Some NAL units carry base layer data while other NAL units carry enhancement layer data.

In some implementations, some of the NAL units may include syntax elements and semantics to aid the video decoder 28 in decoding the base and enhancement layer data without substantial added complexity. For example, one or more syntax elements that indicate the presence of enhancement layer video data in a NAL unit may be provided in the NAL unit that includes the enhancement layer video data, a NAL unit that includes the base layer video data, or both.

The modulator/transmitter 24 may include a suitable modem, amplifier, filter, frequency conversion components to support modulation and wireless transmission of the NAL units produced by the NAL unit module 23. The receiver/demodulator 26 may include a suitable modem, amplifier, filter and frequency conversion components to support wireless reception of the NAL units transmitted by the broadcast server 12. In some aspects, the broadcast server 12 and subscriber device 16 may be equipped for two-way communication, such that the broadcast server 12, the subscriber device 16, or both include both transmit and receive components, and are both capable of encoding and decoding video. In other aspects, the broadcast server 12 may be a subscriber device 16 that is equipped to encode, decode, transmit and receive video data using base layer and enhancement layer encoding. Hence, scalable video processing for video transmitted between two or more subscriber devices is also contemplated.

The NAL unit module 27 extracts syntax elements from the received NAL units and provides associated information to the video decoder 28 for use in decoding base layer and enhancement layer video data. The NAL unit module 27 may be a separate component as shown in FIG. 3, or be embedded within or otherwise integrated with the video decoder 28. The base layer/enhancement layer entropy decoder 39 applies entropy decoding to the received video data. If enhancement layer data is available, the base layer/enhancement layer combiner module 38 combines coefficients from the base layer and enhancement layer, using indications provided by the NAL unit module 27, to support single layer decoding of the combined information. The video decoder 28 decodes the combined video data to produce output video to the drive display device 30. The syntax elements present in each NAL unit, and the semantics of the syntax elements, guide the video decoder 28 in the combination and decoding of the received base layer and enhancement layer video data.

Various components in the broadcast server 12 and the subscriber device 16 may be realized by any suitable combination of hardware, software, and firmware. For example, the video encoder 22 and the NAL unit module 23, as well as the NAL unit module 27 and the video decoder 28, may be realized by one or more general purpose microprocessors, digital signal processors (DSPs), hardware cores, application specific integrated circuits (ASICs), field programmable gate arrays (FPGAs), or any combination thereof. In addition, various components may be implemented within a video encoder-decoder (CODEC). In some cases, some aspects of the disclosed techniques may be executed by a DSP that invokes various hardware components in a hardware core to accelerate the encoding process.

For aspects in which functionality is implemented in software, such as functionality executed by a processor or DSP, the disclosure also contemplates a computer-readable medium comprising codes within a computer program product. When executed in a machine, the codes cause the machine to perform one or more aspects of the techniques described in this disclosure. The machine readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

Figures 4A, 4B, 6:
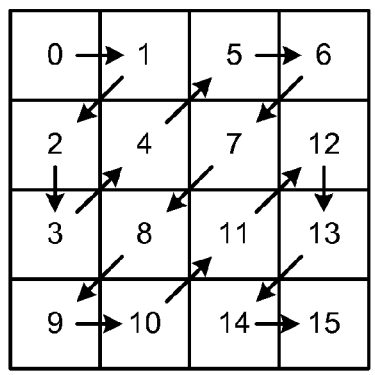
FIGS. 4A and 4B are views for explaining a scan order.
FIG. 6 is a view showing the order of syntax elements in H.264.

Referring to FIG. 4A, in entropy encoding according to H.264, transformation coefficients are processed on a 4×4 block basis after an orthogonal transformation. In the H.264 encoding scheme, five syntax elements (described below) are generated and variable-length-encoded by performing processing in a reverse order (i.e., reverse scan order) to the zigzag scan order shown in FIG. 4A with respect to the 4×4 block. Each transformation coefficient in the block is expressed as Level [I], where "I" represents a zigzag scan number.

Entropy encoding processing of the 4×4 block that includes transformation coefficients shown in FIG. 4B by a context-adaptive variable length coding CAVLC scheme based on the H.264 encoding scheme will be described next. FIG. 5 is a block diagram of a variable-length encoding apparatus (e.g., the video encoder 22) based on the H.264 encoding scheme. FIG. 6 shows the order in which variable-length codes corresponding to five syntax elements on a 4×4 block basis are combined to form an encoded stream.

A TotalCoeffs determination unit 44 calculates the number of transformation coefficients in a 4×4 block that do not have a value=0. For example, with reference to FIG. 4B, the Total-Coeffs=6. A total_zeros determination unit 46 calculates the number of transformation coefficients whose Level [I] value is 0 between Level [9] and Level [0] as final significant coefficients. In this case, total_zeros=4. A trailing_ones determination unit 45 calculates the number of transformation coefficients, up to three, whose absolute values are 1 from Level [9] as final significant coefficients. In this case, since Level [9] and Level [7] correspond to the absolute value 1, trailing_ones=2. Note that a coeff_token variable-length code generation unit 49 calculates coeff_token as a syntax element in a two dimensional event from the value of TotalCoeffs calculated by the TotalCoeffs determination unit 44 and the value of trailing_ones calculated by the trailing_ones determination unit 45.

Since values of "Level" as a syntax element are sequentially generated in the reverse scan order, values of "Level" are sequentially generated from Level [9] as a final significant coefficient. However, the values of "Level" need to be corrected in accordance with the value of trailing_ones calculated by the trailing_ones determination unit 45. A Level selection unit 41 performs this process. The Level selection unit 41 sequentially outputs transformation coefficients whose values of Level [I] are not 0 to a threshold determination unit 42 and a Level variable-length code generation unit 43. If the value of trailing_ones is smaller than 3, 1 is subtracted from the absolute value of first Level [I] whose absolute value is not 1. In this case, since trailing_ones=2, the value "5" obtained by subtracting 1 from the absolute value "6" of Level [6] is output. In addition, the threshold determination unit 42 determines suffixLength and outputs it to the Level variable-length code generation unit 43.

SuffixLength is determined by comparing a threshold table predetermined according to the H.264 specifications with the input value of Level [I]. The Level variable-length code generation unit 43 selects a variable-length table (not shown) to be used for variable-length encoding in accordance with the value of SuffixLength.

A run_before determination unit 47 sequentially calculates zero runs in the reverse scan order. For example, run_before=1 between Level [9] and Level [7], and run_before=0 between Level [7] and Level [6]. Note that a zeros_left managing unit outputs values obtained by subtracting sequentially calculated values of run_before from the values of total_zeros, as zeros_left, to a run_before variable-length code generation unit 51. The run_before variable-length code generation unit 51 generates a variable-length code from the values of run_before and zeros_left.

A variable-length code combination unit 52 sequentially combines a variable-length code input from the coeff_token variable-length code generation unit 49, trailing_ones_sign input from the trailing_ones determination unit 45, a variable-length code input from the Level variable-length code generation unit 43, a variable-length code input from a total_zeros variable-length code generation unit 50, and a variable-length code input from the run_before variable-length code generation unit 51 in accordance with the order shown in FIG. 6.

Figure 7:
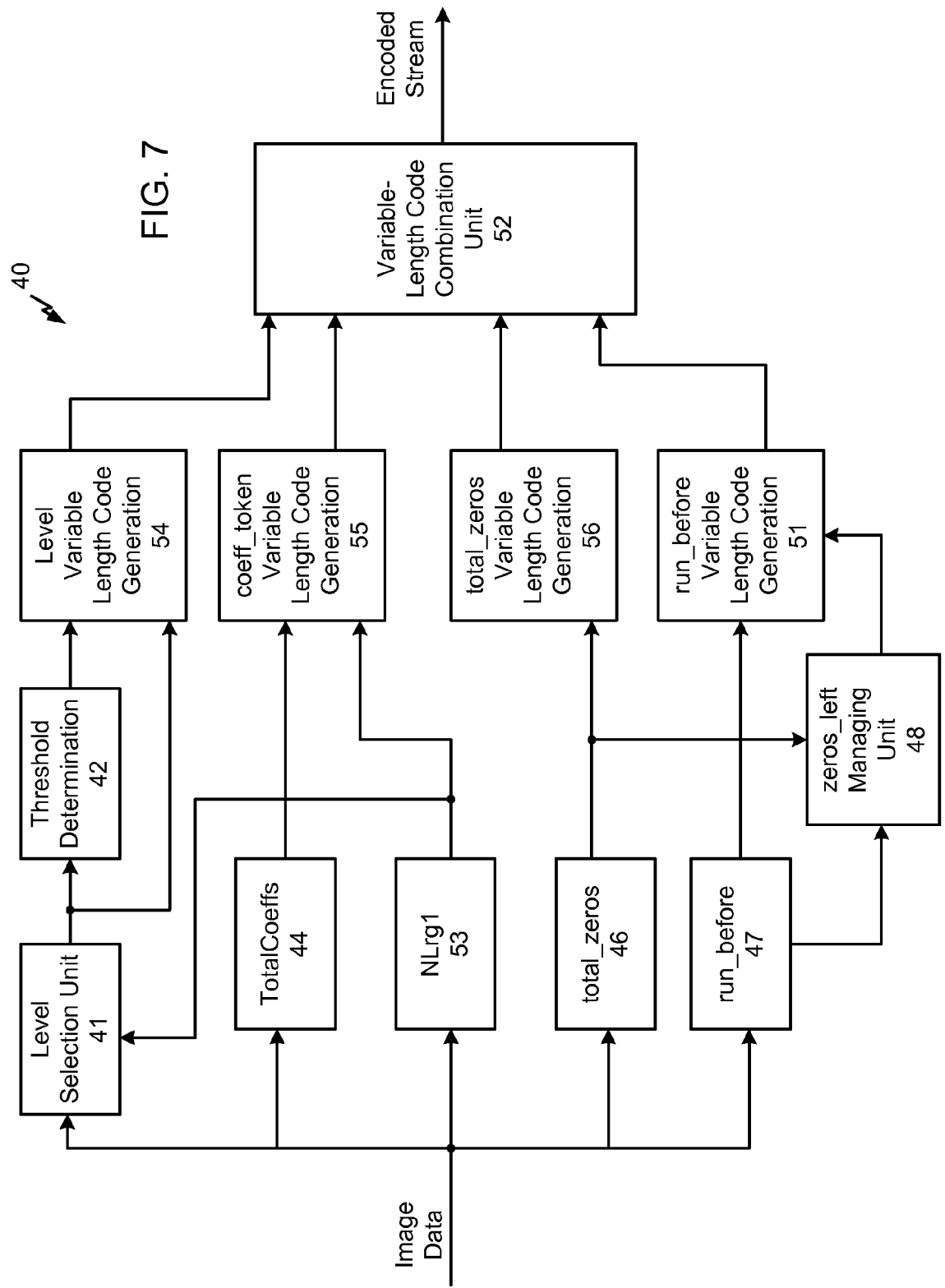
FIG. 7 is an implementation of a variable-length encoding apparatus based on a modified H.264 encoding scheme.

Due to the different scene characteristics in the enhancement layer coding, the CAVLC coding for SVC CGS enhancement layer coding may be inefficient. For example, in many instances, for CGS enhancement layer coding, the residual transform coefficients after quantization is zeros or ones. Thus, the probability of coefficients being larger than 1 is extremely low. Based on this, in an implementation, the CAVLC syntax elements may be modified as shown in FIG. 7, which is an implementation of a variable-length encoding apparatus 40 based on a modified H.264 encoding scheme. In FIG. 7, the elements that are common with the encoding apparatus of FIG. 5 are shown having reference numerals and are not described again hereinbelow.

In the orthogonally transformed 4×4 image data, a number of quantized transform coefficients having an absolute value greater than 1 is determined by an NLrg1 determination unit 53. As compared to FIG. 5, the definition of coeff_token is modified such that coeff_token generation unit 55 encodes the output of the TotalCoeff determination unit 44 and NLrg1 determination unit 53. In some implementations, VLC tables, shown in Tables 1-3 below, may be used to code coeff_token based on an estimate or predictor (nC) of the number of non-zero coefficients (nnz) that is determined from an nnz of the left-hand block (nA) and an nnz of the upper-block (nB) of the 4×4 image data. The estimate (nC) is defined in ISO/IEC 14496-10, and may be determined as follows:

If only the upper block is available, then nC=nB.
If only the left-hand block is available, then nC=nA.
If neither is available, then nC=0.
If both are available, then nC=round((nA+nB)/2).

TABLE 1 coeff_token VLC0

| Nnz | NLrg1 0 | 1 | >=2 |
|---|---|---|---|
| 0 | 1 | — | — |
| 1 | 01 | 00010 | — |
| 2 | 001 | 000010 | 000000101 |
| 3 | 00011 | 0000011 | 000000100 |
| 4 | 000011 | 00000100 | 000000011 |
| 5 | 00000101 | 000000110 | 0000000011 |
| 6 | 000000111 | 0000000100 | 0000000010 |
| 7 | 000000010 | 00000000011 | 00000000010 |
| 8 | 0000000000101 | 0000000000100 | 000000000011 |
| 9 | 00000000000101 | 00000000000100 | 0000000000011 |
| 10 | 0000000000001001 | 0000000000001000 | 00000000000011 |
| 11 | 00000000000001101 | 00000000000000111 | 000000000000101 |
| 12 | 00000000000001100 | 00000000000000110 | 0000000000000111 |
| 13 | 00000000000001011 | 00000000000000101 | 00000000000000011 |
| 14 | 00000000000001010 | 00000000000000100 | 00000000000000010 |
| 15 | 00000000000001001 | 000000000000000011 | 000000000000000001 |
| 16 | 00000000000001000 | 000000000000000010 | 000000000000000000 |

TABLE 2 coeff_token VLC1

| Nnz | NLrg1 0 | 1 | >=2 |
|---|---|---|---|
| 0 | 11 | — | — |
| 1 | 10 | 000110 | — |
| 2 | 011 | 00100 | 00000101 |
| 3 | 010 | 000101 | 0000100 |
| 4 | 0011 | 000100 | 0000011 |
| 5 | 00101 | 0000110 | 00000100 |
| 6 | 000111 | 0000101 | 00000011 |
| 7 | 0000111 | 000000100 | 000000011 |
| 8 | 000000101 | 0000000101 | 0000000100 |
| 9 | 00000000101 | 00000000100 | 0000000011 |
| 10 | 000000000101 | 0000000000111 | 00000000011 |
| 11 | 00000000001101 | 00000000000111 | 000000000100 |
| 12 | 00000000001100 | 00000000000110 | 00000000000100 |
| 13 | 00000000001011 | 00000000000101 | 00000000000011 |
| 14 | 00000000001010 | 00000000000101 | 00000000000010 |
| 15 | 00000000001001 | 00000000000100 | 00000000000001 |
| 16 | 00000000001000 | 000000000000011 | 000000000000000 |

TABLE 3 coeff_token VLC2

| Nnz | NLrg1 0 | 1 | >=2 |
|---|---|---|---|
| 0 | 0111 | — | — |
| 1 | 0110 | 00000110 | — |
| 2 | 111 | 001000 | 000000101 |
| 3 | 110 | 01000 | 0000110 |
| 4 | 101 | 00111 | 000110 |
| 5 | 100 | 00110 | 000101 |
| 6 | 0101 | 00101 | 000100 |
| 7 | 01001 | 000111 | 0000101 |
| 8 | 001001 | 0000111 | 0000100 |
| 9 | 00000111 | 00000101 | 00000100 |
| 10 | 000000111 | 000000110 | 000000100 |
| 11 | 00000001101 | 00000000111 | 0000000111 |
| 12 | 00000001100 | 00000000110 | 00000000011 |
| 13 | 00000001011 | 00000000101 | 000000000011 |
| 14 | 00000001010 | 00000000100 | 000000000010 |
| 15 | 00000001001 | 000000000101 | 000000000001 |
| 16 | 00000001000 | 000000000100 | 000000000000 |

If nC>8, then a fixed length codeword may be written as follows:

If TotalCoeff=0, code 00

Otherwise a 6-bit fixed length code may be used, which is includes 2-bits of min(NLrg1+1,3) and 4-bits of TotalCoeff−1.

In some implementations, when the output of the NLrg1 determination unit 53 is larger than 2, a unary code of (NLrg1−2) is appended thereto.

A level coding determination unit 54 may select a VLC table for level coding based on the number of coefficients that are larger than 1 in the remaining coefficients to be coded. In some implementations, when the magnitude of all the remaining coefficients to be coded is less than or equal to 1, then the sign bits are coded. When the number of coefficients having absolute value is larger than 1 is 1, then VLC table 0 is used, otherwise, VLC table 1 is used to code levels.

The total_zeros generation unit 56 adaptively selects VLC tables based on a total_zeros estimate that may be determined in the same manner as nC (i.e., using number of total_zeros in the block above and to the left of the current block). The VLC table index is assigned as shown below in Table 4. Such an implementation accounts for a total_zeros statistic for the enhancement layers that may differ not only from the base layer, but also from layer to layer. The VLC for total_zeros assignment may be conditioned on TotalCoeff values. Tables 5 and 6 are the VLC table for total_zeros.

TABLE 4 total_zeros VLC table index assignment

| total_zeros estimate | VLC table index |
|---|---|
| 0, 1, 2 | 0 |
| 3, 4, . . . , 15 | 1 |

TABLE 5 total_zeros VLC table0

| TotalCoeff total_zeros | 1 | 2 | 3 | 4 | 5 | 6 | 7 |
|---|---|---|---|---|---|---|---|
| 0 | 1 | 11 | 0011 | 0011 | 0011 | 000001 | 00001 |
| 1 | 011 | 101 | 111 | 111 | 111 | 0011 | 0011 |
| 2 | 010 | 100 | 110 | 110 | 110 | 101 | 101 |
| 3 | 0011 | 011 | 101 | 101 | 101 | 100 | 100 |
| 4 | 0010 | 010 | 100 | 100 | 100 | 0010 | 011 |
| 5 | 0001 | 0011 | 011 | 011 | 011 | 011 | 11 |
| 6 | 000011 | 0010 | 010 | 0010 | 0010 | 11 | 010 |
| 7 | 000010 | 0001 | 0010 | 0001 | 010 | 010 | 0010 |
| 8 | 000001 | 00001 | 00001 | 010 | 0001 | 00001 | 0001 |
| 9 | 0000001 | 0000001 | 0001 | 00001 | 000001 | 0001 | 00000 |
| 10 | 000000001 | 000001 | 000001 | 000001 | 00001 | 000000 | — |
| 11 | 00000001 | 00000001 | 00000001 | 0000001 | 000000 | — | — |
| 12 | 0000000001 | 000000001 | 0000001 | 0000000 | — | — | — |
| 13 | 00000000001 | 0000000001 | 00000000 | — | — | — | — |
| 14 | 000000000001 | 0000000000 | — | — | — | — | — |
| 15 | 000000000000 | — | — | — | — | — | — |

| TotalCoeff total_zeros | 8 | 9 | 10 | 11 | 12 | 13 | 14 | 15 |
|---|---|---|---|---|---|---|---|---|
| 0 | 00001 | 00001 | 00001 | 0001 | 0001 | 001 | 01 | 1 |
| 1 | 101 | 0001 | 0001 | 001 | 001 | 01 | 1 | 0 |
| 2 | 0001 | 011 | 11 | 11 | 01 | 1 | 00 | — |
| 3 | 100 | 11 | 10 | 10 | 1 | 000 | — | — |
| 4 | 11 | 010 | 001 | 01 | 0000 | — | — | — |
| 5 | 011 | 001 | 01 | 0000 | — | — | — | — |
| 6 | 010 | 10 | 00000 | — | — | — | — | — |
| 7 | 001 | 00000 | — | — | — | — | — | — |
| 8 | 00000 | — | — | — | — | — | — | — |
| 9 | — | — | — | — | — | — | — | — |
| 10 | — | — | — | — | — | — | — | — |
| 11 | — | — | — | — | — | — | — | — |
| 12 | — | — | — | — | — | — | — | — |
| 13 | — | — | — | — | — | — | — | — |
| 14 | — | — | — | — | — | — | — | — |
| 15 | — | — | — | — | — | — | — | — |

TABLE 6 total_zeros VLC table1

| TotalCoeff total_zeros | 1 | 2 | 3 | 4 | 5 | 6 | 7 |
|---|---|---|---|---|---|---|---|
| 0 | 11 | 0101 | 00011 | 000001 | 000001 | 000001 | 000001 |
| 1 | 101 | 111 | 0101 | 00001 | 000000 | 000000 | 000000 |
| 2 | 100 | 110 | 0100 | 0101 | 0011 | 00001 | 00001 |
| 3 | 011 | 101 | 111 | 0100 | 0010 | 0011 | 0011 |
| 4 | 0011 | 100 | 110 | 111 | 111 | 0010 | 0010 |
| 5 | 010 | 011 | 101 | 110 | 110 | 101 | 11 |
| 6 | 0010 | 0100 | 100 | 101 | 101 | 11 | 011 |
| 7 | 00011 | 0011 | 011 | 0011 | 100 | 100 | 010 |
| 8 | 00010 | 0010 | 0011 | 100 | 011 | 011 | 10 |
| 9 | 000011 | 00001 | 0010 | 011 | 0001 | 010 | 0001 |
| 10 | 000010 | 0001 | 00010 | 0010 | 010 | 0001 | — |
| 11 | 000001 | 000001 | 00001 | 0001 | 00001 | — | — |
| 12 | 0000001 | 0000001 | 000001 | 000000 | — | — | — |
| 13 | 00000001 | 00000001 | 000000 | — | — | — | — |
| 14 | 000000001 | 00000000 | — | — | — | — | — |
| 15 | 000000000 | — | — | — | — | — | — |

| TotalCoeff total_zeros | 8 | 9 | 10 | 11 | 12 | 13 | 14 | 15 |
|---|---|---|---|---|---|---|---|---|
| 0 | 000001 | 00001 | 00001 | 0001 | 0001 | 001 | 01 | 1 |
| 1 | 000000 | 00000 | 00000 | 0000 | 0000 | 000 | 1 | 0 |
| 2 | 00001 | 0001 | 0001 | 001 | 01 | 1 | 00 | — |
| 3 | 0001 | 011 | 001 | 11 | 1 | 01 | — | — |
| 4 | 011 | 010 | 11 | 10 | 001 | — | — | — |
| 5 | 010 | 11 | 10 | 01 | — | — | — | — |
| 6 | 11 | 10 | 01 | — | — | — | — | — |
| 7 | 10 | 001 | — | — | — | — | — | — |
| 8 | 001 | — | — | — | — | — | — | — |
| 9 | — | — | — | — | — | — | — | — |
| 10 | — | — | — | — | — | — | — | — |
| 11 | — | — | — | — | — | — | — | — |
| 12 | — | — | — | — | — | — | — | — |
| 13 | — | — | — | — | — | — | — | — |
| 14 | — | — | — | — | — | — | — | — |
| 15 | — | — | — | — | — | — | — | — |

The variable-length code combination unit 52 sequentially combines and outputs a variable-length code input from the coeff_token variable-length code generation unit 55, a variable-length code input from the Level variable-length code generation unit 54, a variable-length code input from the Total_zeros variable-length code generation unit 56, and a variable-length code input from the run_before variable-length code generation unit 51.

Figure 8:
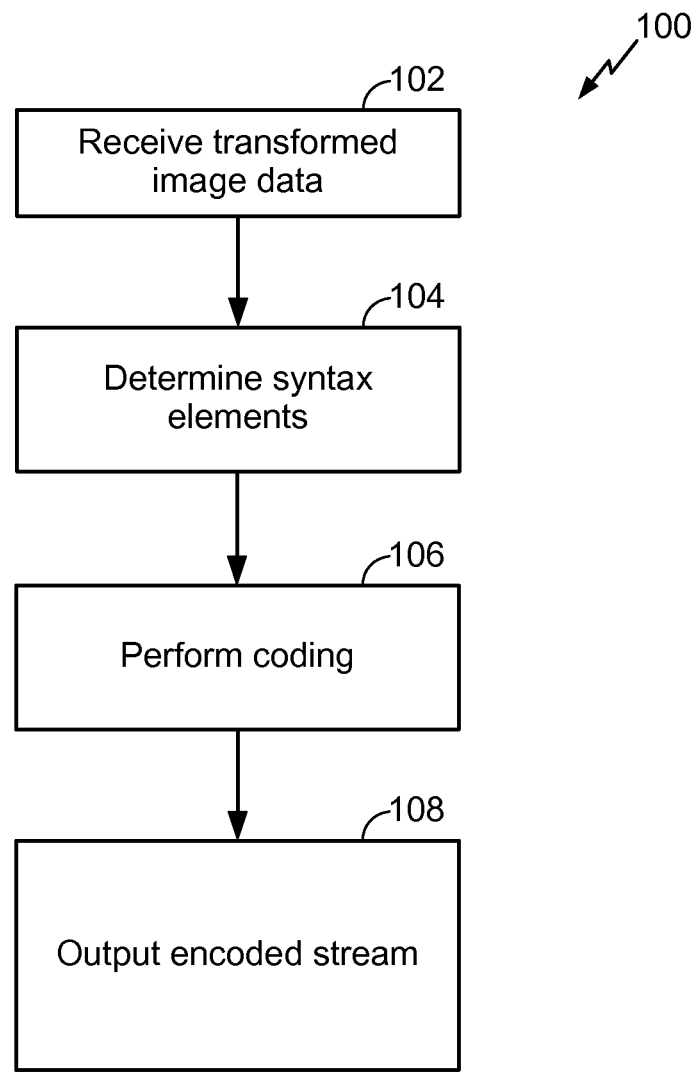
FIG. 8 shows stages of a process for CAVLC for scalable video coding (SVC) coarse granular scalability (CGS) enhancement layer coding

FIG. 8 shows stages of a process 100 for CAVLC for scalable video coding (SVC) coarse granular scalability (CGS) enhancement layer coding. At 102, image data is received. For example, orthogonally transformed block image data may be received by the encoder 22. At 104, syntax elements are determined. For example, the syntax elements may specify coding in accordance with coefficients within the block image data. At 106, coding is performed. For example, coding may be performed by adaptively applying VLC tables to code the image data. At 108, the encoded stream is output. For example, the encoded stream may be output from the video encoder for processing and transmission.

Figure 9:
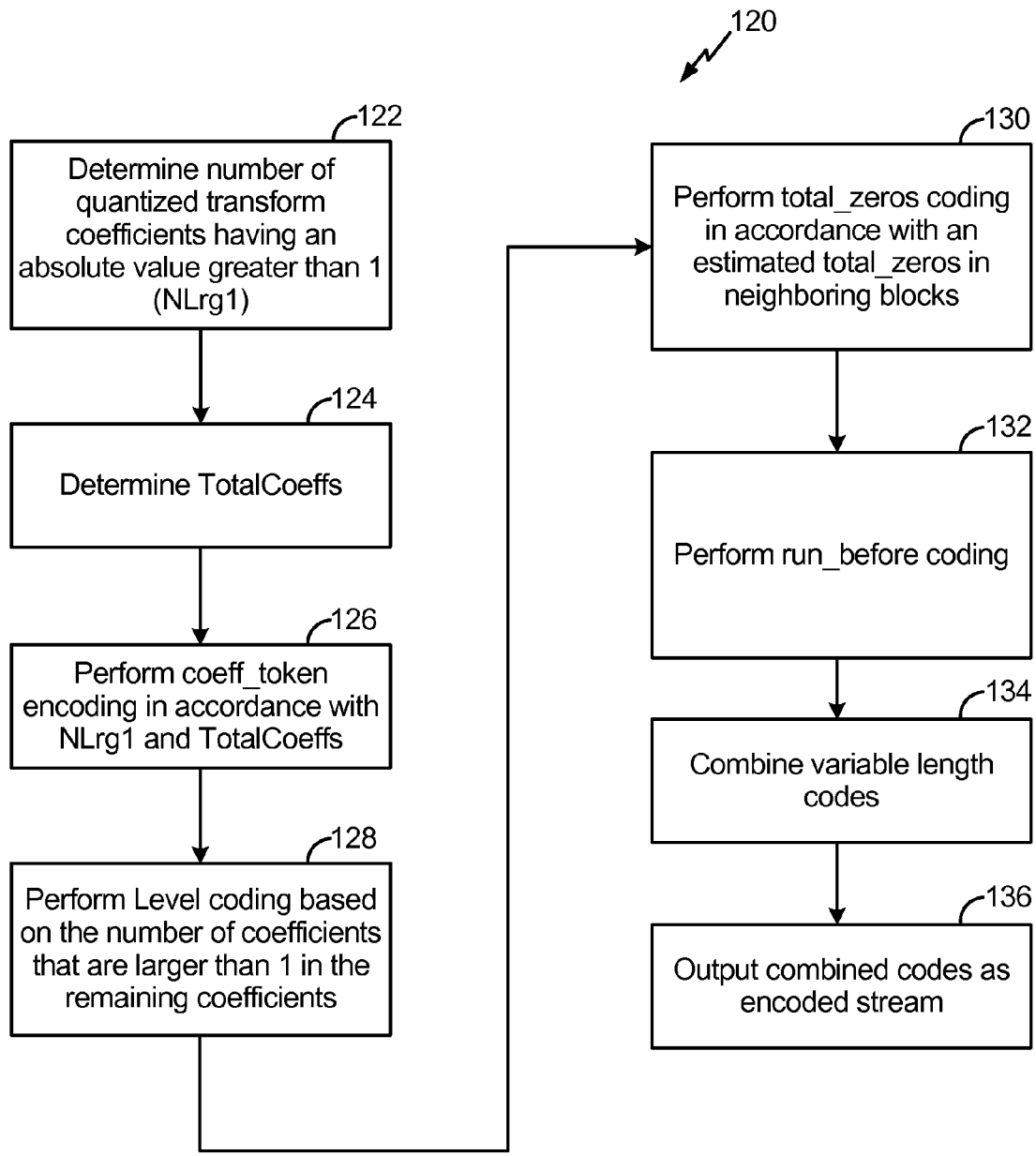
FIG. 9 shows stages of the process for determination of syntax elements and outputting of the encoded stream.

FIG. 9 shows stages of the process 120 for determining syntax elements and outputting of the encoded stream. At 122, the number of quantized transform coefficients having an absolute value greater than 1 is determined (NLrg1). For example, the NLrg1 determination unit 51 may determine this value from the input block image data. At 124, TotalCoeffs is determined. For example, the TotalCoeffs determination unit 44 may calculate the number of transformation coefficients in the image data block that do not have a value=0.

At 126, coeff_token encoding is performed in accordance with NLrg1 and TotalCoeffs. For example, the coeff_token variable-length code generation unit 49 calculates coeff_token as a syntax element from the value of TotalCoeffs calculated by the TotalCoeffs determination unit 55 and the output of the NLrg1 determination unit 53. At 128, level coding is performed based on the number of coefficients are larger than one in the remaining coefficients. For example, the level code generation unit 54 may select a VLC table for level coding based on the number of coefficients that are larger than 1 in the remaining coefficients to be coded. At 130, total_zeros coding is performed in accordance with an estimate. For example, the total_zeros generation unit 56 may adaptively select VLC tables based on a total_zeros estimate determined using number of total_zeros in the block above and to the left of the current block.

At 132, run_before coding is performed. For example, the run_before determination unit 47 may sequentially calculate zero runs in the reverse scan order. At 134, the variable length codes determined at 126, 128, 130 and 132 are combined. At 136, the combined codes are output as an encoded stream. For example, the encoded stream may be output from the encoder 22.

The embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

The stages of a method or algorithm described in connection with the embodiments disclosed herein may be embodied directly in hardware, in a software module executed by a processor, or in a combination of the two. A software module may reside in random access memory ("RAM"), flash memory, read-only memory ("ROM"), erasable programmable read-only memory ("EPROM"), electrically-erasable programmable read-only memory ("EEPROM"), registers, a hard disk, a removable disk, a CD-ROM, or any other form of storage medium known in the art. An example storage medium is coupled to the processor, such that the processor can read information from, and write information to, the storage medium. In the alternative, the storage medium may be integral to the processor. The processor and the storage medium may reside in an application-specific user circuit ("ASIC"). The ASIC may reside in a user terminal. In the alternative, the processor and the storage medium may reside as discrete components in a user terminal.

It should be noted that the methods described herein may be implemented on a variety of hardware, processors and systems known by one of ordinary skill in the art. For example, a machine that is used in an implementation may have a display to display content and information, a processor to control the operation of the client and a memory for storing data and programs related to the operation of the machine. In some implementations, the machine is a cellular phone. In some implementations, the machine is a handheld computer or handset having communications capabilities. In another implementation, the machine is a personal computer having communications capabilities.

The various illustrative logics, logical blocks, modules, and circuits described in connection with the implementations disclosed herein may be implemented or performed with a general purpose processor, a DSP, an ASIC, a field programmable gate array (FPGA) or other programmable logic device, discrete gate or transistor logic, discrete hardware components, or any combination thereof designed to perform functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for context-based adaptive variable length coding (VLC), the method comprising:
   receiving transformed block image data;
   determining syntax elements from the transformed block image data, the syntax elements including a TotalCoeffs value, a number of quantized transform coefficients having an absolute value larger than 1 (NLrg1) value, a total_zeros value, a run_before value, and a level value; and
   coding the determined syntax elements, wherein at least a portion of the syntax elements are coded in accordance with at least the NLrg1 value.

2. The method of claim 1, further comprising:
   encoding a coeff_token in accordance with the NLrg1 value and the TotalCoeffs value, wherein the determined syntax elements include the coeff_token.

3. The method of claim 2, further comprising:
   determining a predictor nC based on the number non-zero coefficients of a previously coded left-hand block nA and a previously coded upper block nB;
   selecting a VLC table to perform coeff_token encoding based on the predictor nC.

4. The method of claim 3, further comprising:
   using a fixed codeword if nC is greater than a predetermined integer value; and
   using a fixed length code which that includes min(NLrg1+1,3) and TotalCoeff−1 if nC is less than the predetermined integer value.

5. The method of claim 3, further comprising:
   appending a unary code of NLrg1−2 if NLrg1 is greater than 2.

6. The method of claim 1, further comprising:
   determining level coding in accordance with the number of coefficients that are larger than 1 in the remaining coefficients to be coded of the transformed coefficients.

7. The method of claim 6, further comprising:
   coding sign bits if a magnitude of the remaining coefficients to be coded of the transformed coefficients is less than or equal to 1.

8. The method of claim 6, further comprising:
   coding levels using VLC table 0 if the number of coefficients that are larger than 1 is 1; and
   coding levels using VLC table 1 if the number of coefficients that are larger than 1 is not 1.

9. The method of claim 1, further comprising:
   determining total_zeros encoding based on an estimated total_zeros value determined from a neighboring blocks' total_zeros.

10. A context-adaptive variable length coding (VLC) apparatus, comprising:
    syntax element determination units that determine a TotalCoeffs value, a number of quantized transform coefficients having an absolute value larger than 1 (NLrg1) value, a total_zeros value, a run_before value, and a level value;
    a coeff_token generation unit that encodes coeff_token in accordance with the NLrg1 value and the TotalCoeffs value;
    a level code generation unit that determines level coding in accordance with the number of coefficients that are larger than 1 in the remaining coefficients to be coded of the transformed coefficients;

a total_zeros generation unit that determines total_zeros encoding based on an estimated total_zeros value determined from a neighboring blocks' total_zeros;

a run_before generation unit that generates a variable-length code from the values of run_before and zeros_left; and a variable length combination unit that combines the output of the coeff_token generation unit, the level code generation unit, the total_zeros generation unit and the run_before generation unit.

11. The apparatus of claim 10, wherein the total_zeros generation unit and the coeff_token generation unit determine a predictor nC based on the number non-zero coefficients of a previously coded left-hand block nA and a previously coded upper block nB, and select a VLC table to perform coeff_token encoding based on the predictor nC.

12. The apparatus of claim 11, wherein a fixed codeword is written if nC is greater than a predetermined integer value, or a fixed length code is written which that includes min (NLrg1+1,3) and TotalCoeff−1 is used if nC is less than the predetermined integer value.

13. The apparatus of claim 10, wherein a unary code of NLrg1−2 is appended if NLrg1 is greater than 2.

14. The apparatus of claim 10,
wherein the level code generation unit codes sign bits if a magnitude of the remaining coefficients to be coded of the transformed coefficients is less than or equal to 1, and
wherein the level code generation unit codes levels using VLC table 0 if the number of coefficients that are larger than 1 is 1 and codes levels using VLC table 1 if the number of coefficients that are larger than 1 is not 1.

15. A video encoder that performs context-based adaptive variable length coding (VLC), the video encoder comprising:
means for receiving transformed block image data;
means for determining syntax elements from the transformed block image data, the syntax elements including a TotalCoeffs value, a number of quantized transform coefficients having an absolute value larger than 1 (NLrg1) value, a total_zeros value, a run_before value, and a level value; and
means for coding the determined syntax elements, wherein at least a portion of the syntax elements are coded in accordance with at least the NLrg1 value.

16. The video encoder of claim 15, further comprising:
means for encoding a coeff_token in accordance with the NLrg1 value and the TotalCoeffs value, wherein the determined syntax elements include the coeff_token.

17. The video encoder of claim 16, wherein the means for encoding the coeff_token determines a predictor nC based on the number non-zero coefficients of a previously coded left-hand block nA and a previously coded upper block nB, and selects a VLC table to perform coeff_token encoding based on the predictor nC.

18. The video encoder of claim 15, further comprising:
means for determining level coding in accordance with the number of coefficients that are larger than 1 in the remaining coefficients to be coded of the transformed coefficients.

19. The video encoder of claim 18, further comprising:
means for coding sign bits if a magnitude of the remaining coefficients to be coded of the transformed coefficients is less than or equal to 1; and
means for coding levels using VLC table 0 if the number of coefficients that are larger than 1 is 1 and using VLC table 1 if the number of coefficients that are larger than 1 is not 1.

20. The video encoder of claim 15, further comprising:
means for determining total_zeros encoding based on an estimated total_zeros value determined from a neighboring blocks' total_zeros.

21. A non-transitory computer-readable medium comprising executable instructions to perform a method of context-based adaptive variable length coding (VLC), the method comprising:
receiving transformed block image data;
determining syntax elements from the transformed block image data, the syntax elements including a TotalCoeffs value, a number of quantized transform coefficients having an absolute value larger than 1 (NLrg1) value, a total_zeros value, a run_before value, and a level value; and
coding the determined syntax elements, wherein at least a portion of the syntax elements are coded in accordance with at least the NLrg1 value.

22. The non-transitory computer-readable medium of claim 21, further comprising instructions to perform:
encoding of a coeff_token in accordance with NLrg1 value and the TotalCoeffs value, wherein the determined syntax elements include the coeff_token.

23. The non-transitory computer-readable medium of claim 21, further comprising instructions to perform:
determining a predictor nC based on the number non-zero coefficients of a previously coded left-hand block nA and a previously coded upper block nB;
selecting a VLC table to perform coeff_token encoding based on the predictor nC.

24. The non-transitory computer-readable medium of claim 21, further comprising instructions to perform:
determining level coding in accordance with the number of coefficients that are larger than 1 in the remaining coefficients to be coded of the transformed coefficients.

25. The non-transitory computer-readable medium of claim 21, further comprising instructions to perform:
determining total_zeros encoding based on an estimated total_zeros value determined from a neighboring blocks' total_zeros.

* * * * *